(12) United States Patent
Galbraith et al.

(10) Patent No.: US 6,349,783 B1
(45) Date of Patent: Feb. 26, 2002

(54) MOTORCYCLE SADDLEBAG MOUNTING SYSTEM

(75) Inventors: Stephen L. Galbraith, Mequon; Brian Sucharski, Franklin, both of WI (US)

(73) Assignee: Harley-Davidson Motor Company Group, Inc., Milwaukee, WI (US)

(*) Notice: Subject to any disclaimer, the term of this patent is extended or adjusted under 35 U.S.C. 154(b) by 0 days.

(21) Appl. No.: 09/365,296

(22) Filed: Jul. 30, 1999

(51) Int. Cl.[7] .................................................. B62J 7/04
(52) U.S. Cl. ..................... 180/219; 280/288.4; 224/423
(58) Field of Search ................................ 403/330, 331; 248/222.41, 223.21; 224/413, 423, 447, 450; 280/288.4, 304.5; 180/219, 225

(56) References Cited

U.S. PATENT DOCUMENTS

| | | | | |
|---|---|---|---|---|
| 3,788,532 A | * | 1/1974 | Bish | 224/31 |
| 3,795,354 A | * | 3/1974 | Stippich | 224/32 A |
| 4,580,706 A | * | 4/1986 | Jackson et al. | 224/32 A |
| 4,979,658 A | * | 12/1990 | Baker | 224/153 |
| 5,738,020 A | * | 4/1998 | Correia | 109/51 |
| 5,762,249 A | * | 6/1998 | Hann | 224/430 |
| 5,779,303 A | * | 7/1998 | Kuelbs et al. | 297/215.11 |
| 6,053,384 A | * | 4/2000 | Bachman | 224/430 |
| 6,123,239 A | * | 9/2000 | Lovitt | 224/413 |

OTHER PUBLICATIONS

1987–1989 1340 Parts Catalog, pp. 258–261.
1997 J & P Cycles, pp. 22–3 and 22–4.
1993 and 1994 1340 Parts Catalog, pp. 298–301.

* cited by examiner

*Primary Examiner*—Avraham H. Lerner
(74) *Attorney, Agent, or Firm*—Michael Best & Friedrich LLP

(57) ABSTRACT

A saddlebag mounting system that eliminates the need for external fasteners on the rear fender and corresponding tail section. The saddlebag is mounted to the inner surface of the rear fender using a saddlebag mounting system, including a mounting bracket. The mounting bracket preferably includes an inner bracket coupled to the inner surface of the rear fender, and an outer bracket coupled to the inner bracket, the saddlebag being mounted to the outer bracket. The rear fender can be provided with an inner support mounted to the inner surface to facilitate attachment of the inner bracket. For example, the inner support can include a slotted opening, and a fastener can be used to couple the inner bracket to the inner support. Preferably, the fastener includes a head portion positioned within the slotted opening. The slotted opening can take on a variety of shapes, but preferably includes a wide portion larger than the head portion of the fastener, and a narrow portion smaller than the head portion of the fastener. With this design, the head portion can be inserted into the wide portion and subsequently slid into the narrow portion. Tightening of the fastener to the inner bracket will result in securing the inner bracket to the inner support.

18 Claims, 12 Drawing Sheets

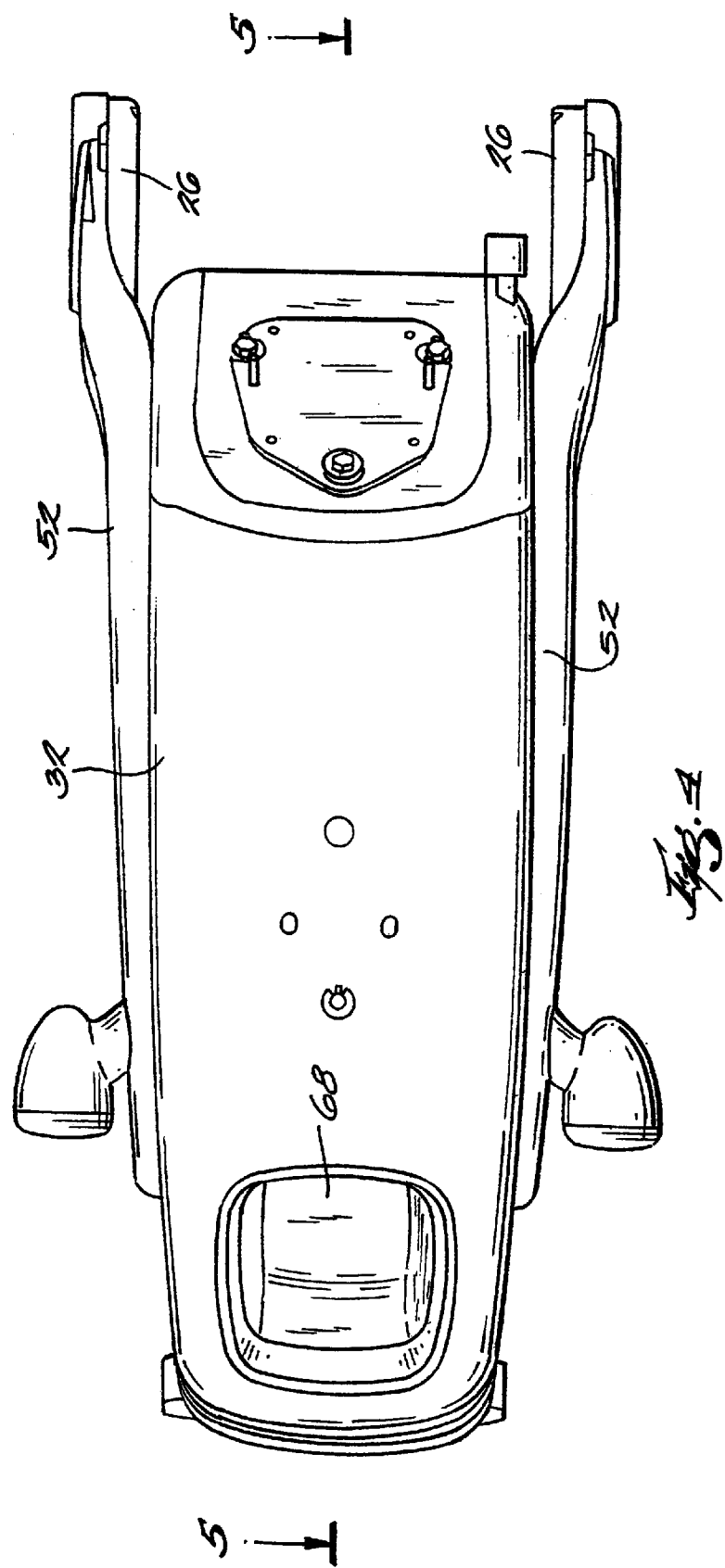

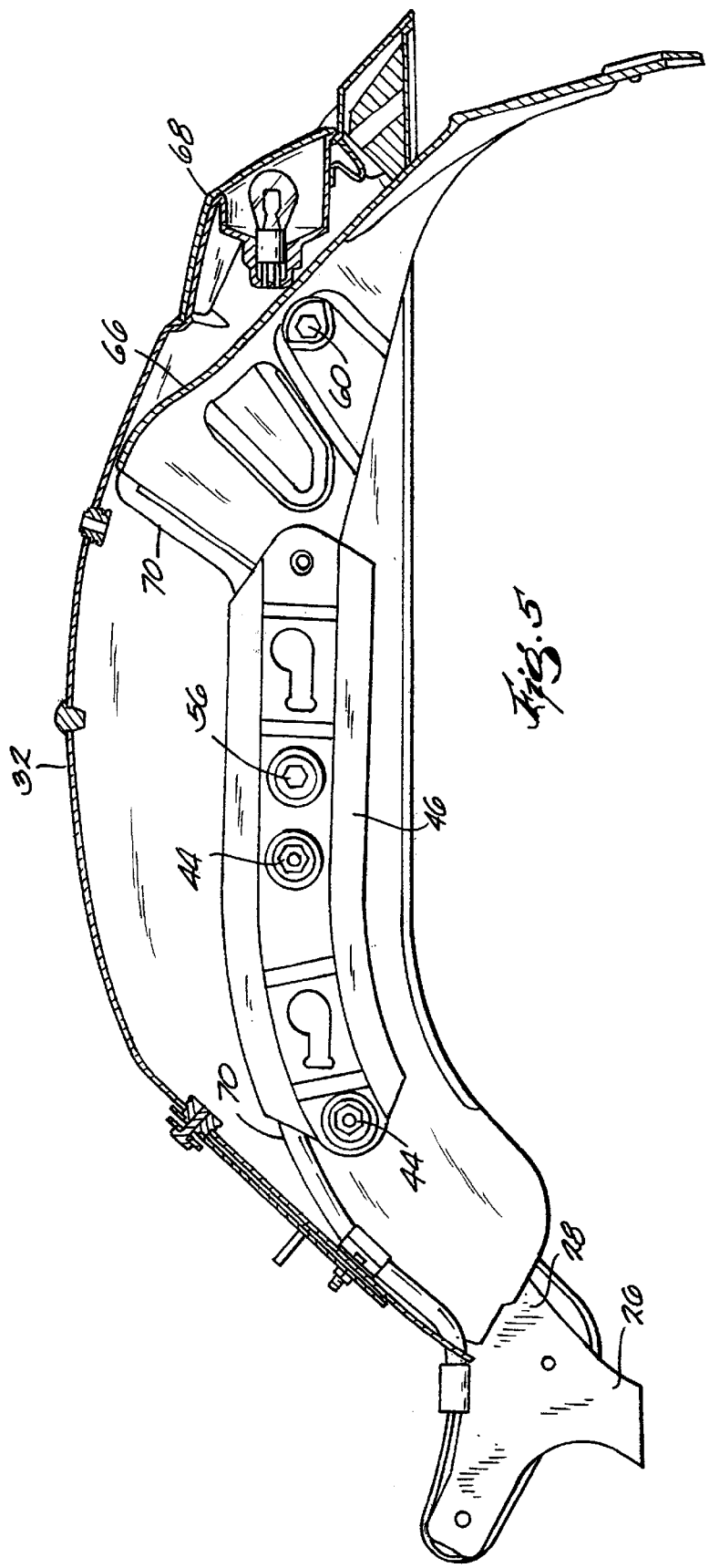

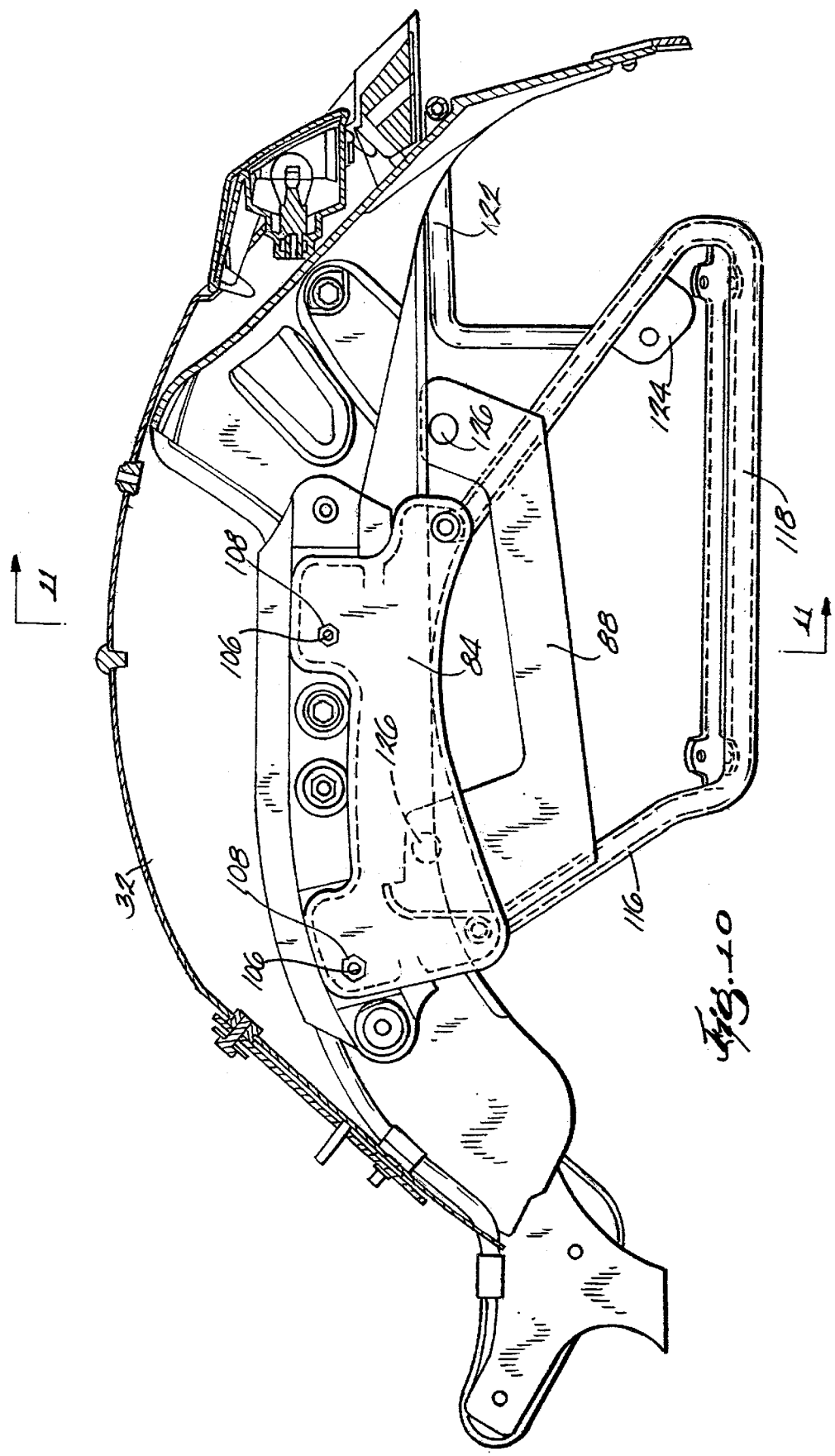

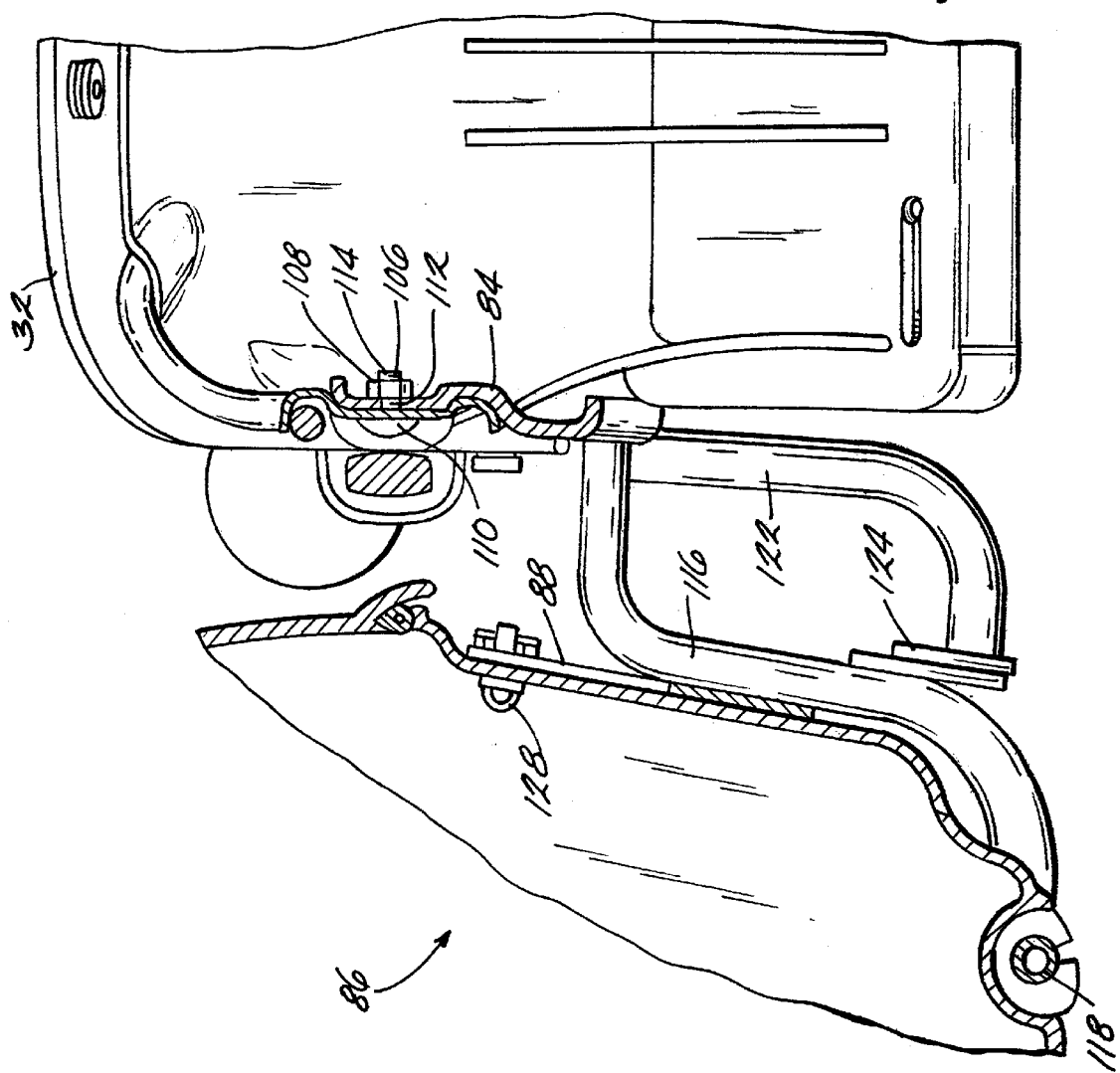

MOTORCYCLE SADDLEBAG MOUNTING SYSTEM

FIELD OF THE INVENTION

The present invention relates generally to the field of motorcycles and, more specifically, to the field of saddlebag mounting systems.

BACKGROUND OF THE INVENTION

Motorcycles typically include fenders positioned over the wheels to prevent debris (e.g., dirt, water, etc.) from being thrown into the air as the motorcycle travels over a surface. For example, front and rear fenders can be positioned around the front and rear wheels, respectively.

The front fender can be coupled to the front fork of the motorcycle so that the front fender turns with the fork and wheel. The front fender can be secured to the fork so that the front fender either moves upward when the front wheel encounters a bump or, alternatively, stays stationary relative to the upward moving wheel.

The rear fender can be coupled to the tail section of the frame in a position over the rear wheel. This is commonly done in such a way that the rear fender does not move with the rear wheel when the rear wheel encounters a bump. In this design, the rear fender is typically bolted to the tail section of the motorcycle using bolts that pass through the tail section and through the rear fender.

Some motorcycles also include saddlebags that provide a compartment for storing items on the motorcycle. Saddlebags are commonly mounted on opposing sides of the rear fender, and can be secured to the motorcycle using the bolts that mount the rear fender to the tail section.

SUMMARY OF THE INVENTION

The above-described design provides an adequate means for attaching the rear fender and the saddlebags to a motorcycle. However, it can be understood that the above-described fender-mounting bolts will be visible when the saddlebags are not mounted. Such a design can detract from the overall aesthetic quality of the motorcycle.

The present invention provides an improved saddlebag mounting system that eliminates the need for external fasteners on the rear fender and corresponding tail section. In one aspect, the invention is embodied in a motorcycle comprising a frame, a front wheel coupled to the frame, and a rear wheel coupled to the frame. A rear fender is coupled to the frame and positioned over the rear fender, and a saddlebag is coupled to the inner surface of the rear fender. Preferably, the outer surface of the rear fender is substantially free of mounting hardware for mounting the saddlebag.

In one embodiment, the saddlebag is mounted to the inner surface of the rear fender using a saddlebag mounting system, including a mounting bracket. The mounting bracket preferably includes an inner bracket coupled to the inner surface of the rear fender, and an outer bracket coupled to the inner bracket, the saddlebag being mounted to the outer bracket.

The rear fender can be provided with an inner support mounted to the inner surface to facilitate attachment of the inner bracket. For example, the inner support can include a slotted opening, and a fastener can be used to couple the inner bracket to the inner support. Preferably, the fastener includes a head portion positioned within the slotted opening. The slotted opening can take on a variety of shapes, but preferably includes a wide portion larger than the head portion of the fastener, and a narrow portion smaller than the head portion of the fastener. With this design, the head portion can be inserted into the wide portion and subsequently slid into the narrow portion. Tightening of the fastener to the inner bracket will result in securing the inner bracket to the inner support.

BRIEF DESCRIPTION OF THE DRAWINGS

FIG. 4 is a top view of the tail section illustrated in FIG. 1.

FIG. 5 is a section view taken along line 5—5 in FIG. 4.

FIG. 10 is a longitudinal section view of the saddlebag mounting system connected to a motorcycle fender.

FIG. 11 is a section view taken along line 11—11 in FIG. 10 with the saddlebag mounting system connected to the motorcycle and a saddlebag connected to the mounting system.

DETAILED DESCRIPTION

Figure 1:
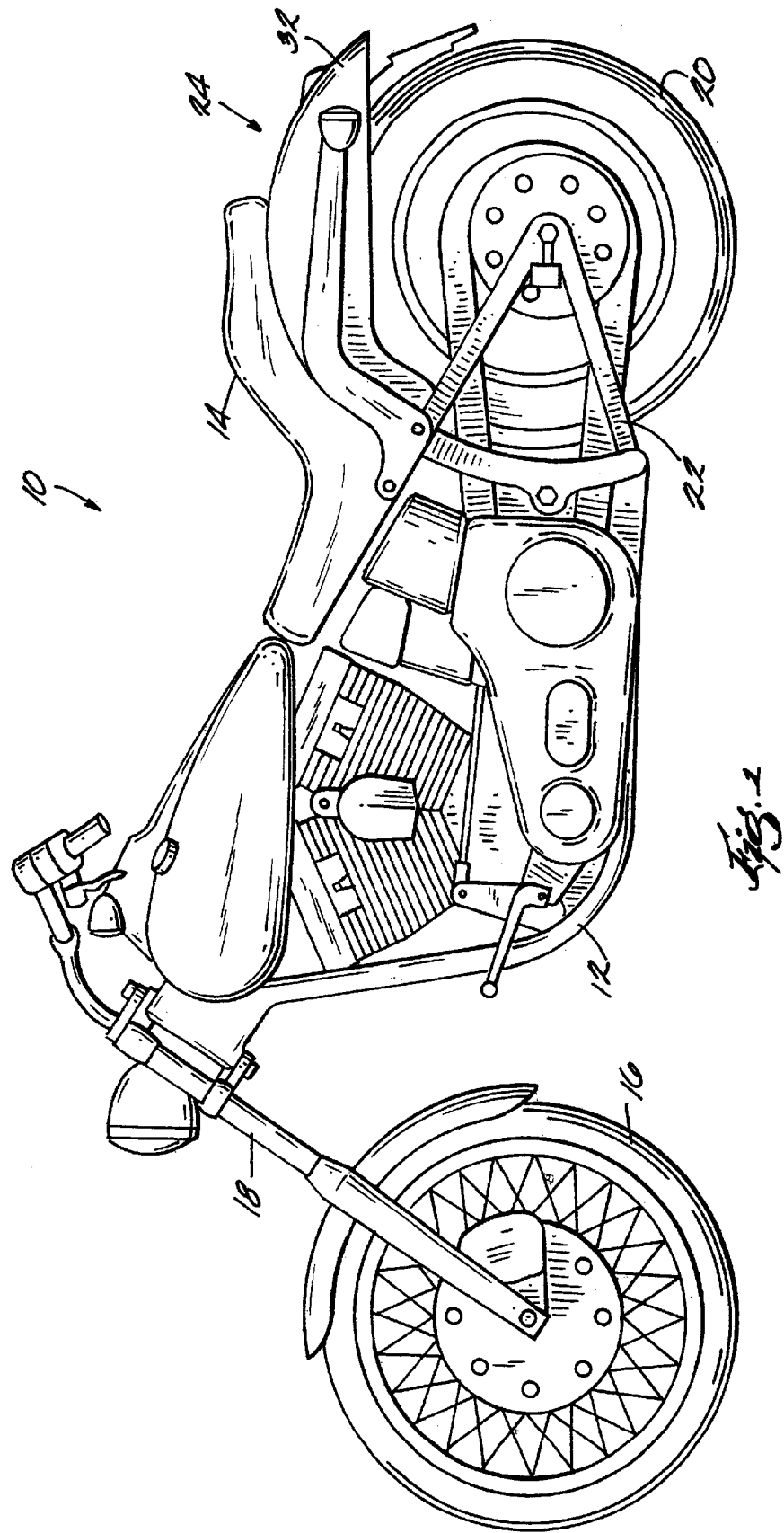
FIG. 1 is a side view of a motorcycle having a tail section.

The motorcycle 10 illustrated in FIG. 1 includes a frame 12, a seat 14 coupled to the frame 12, a front wheel 16 coupled to the frame by a front fork 18, and a rear wheel 20 coupled to the frame by a swing arm assembly 22. A tail section 24 forms the rear portion of the motorcycle 10 underneath the seat 14 and above the rear wheel 20.

Figure 2:
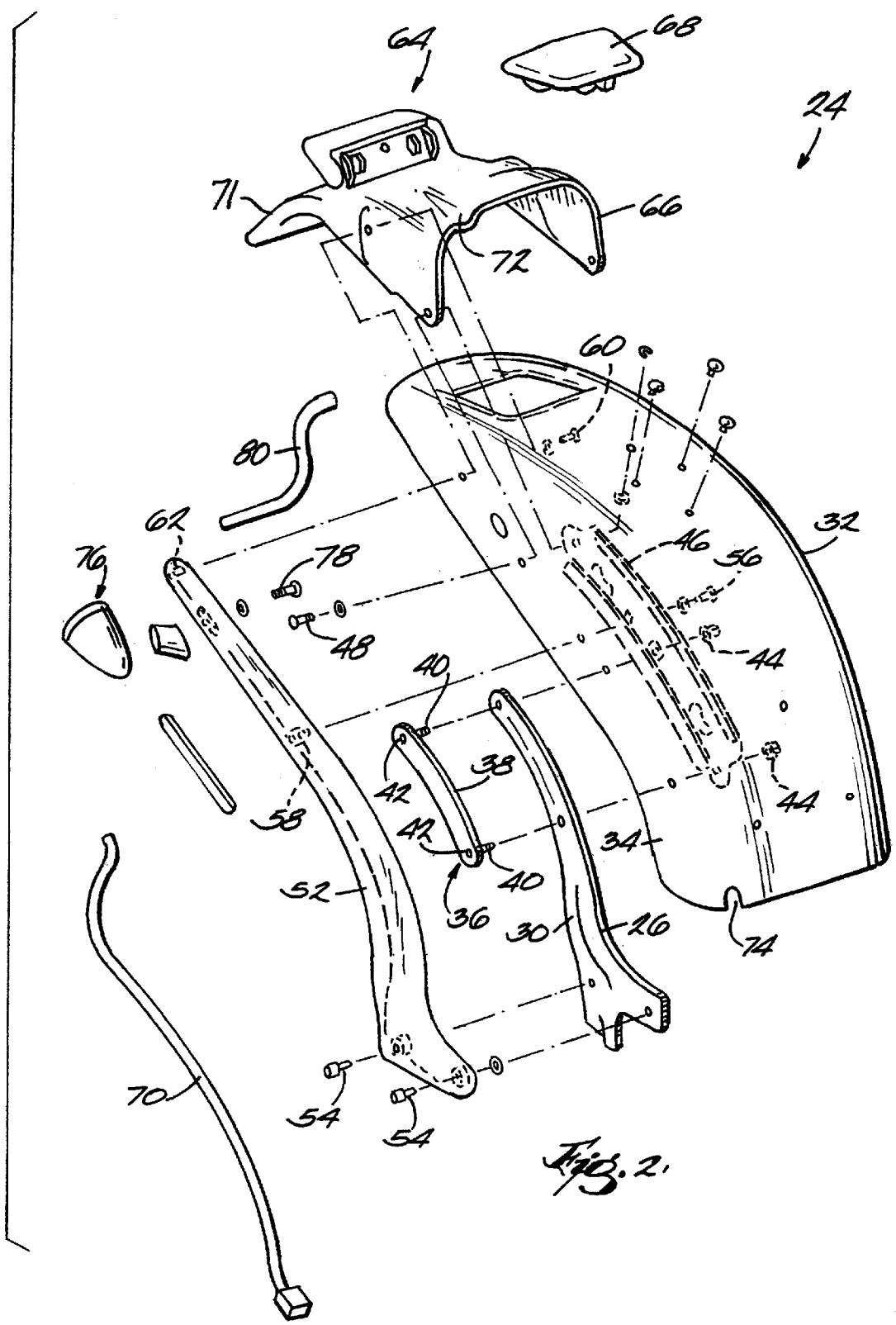
FIG. 2 is an exploded perspective view of the tail section illustrated in FIG. 1.
Figure 3:
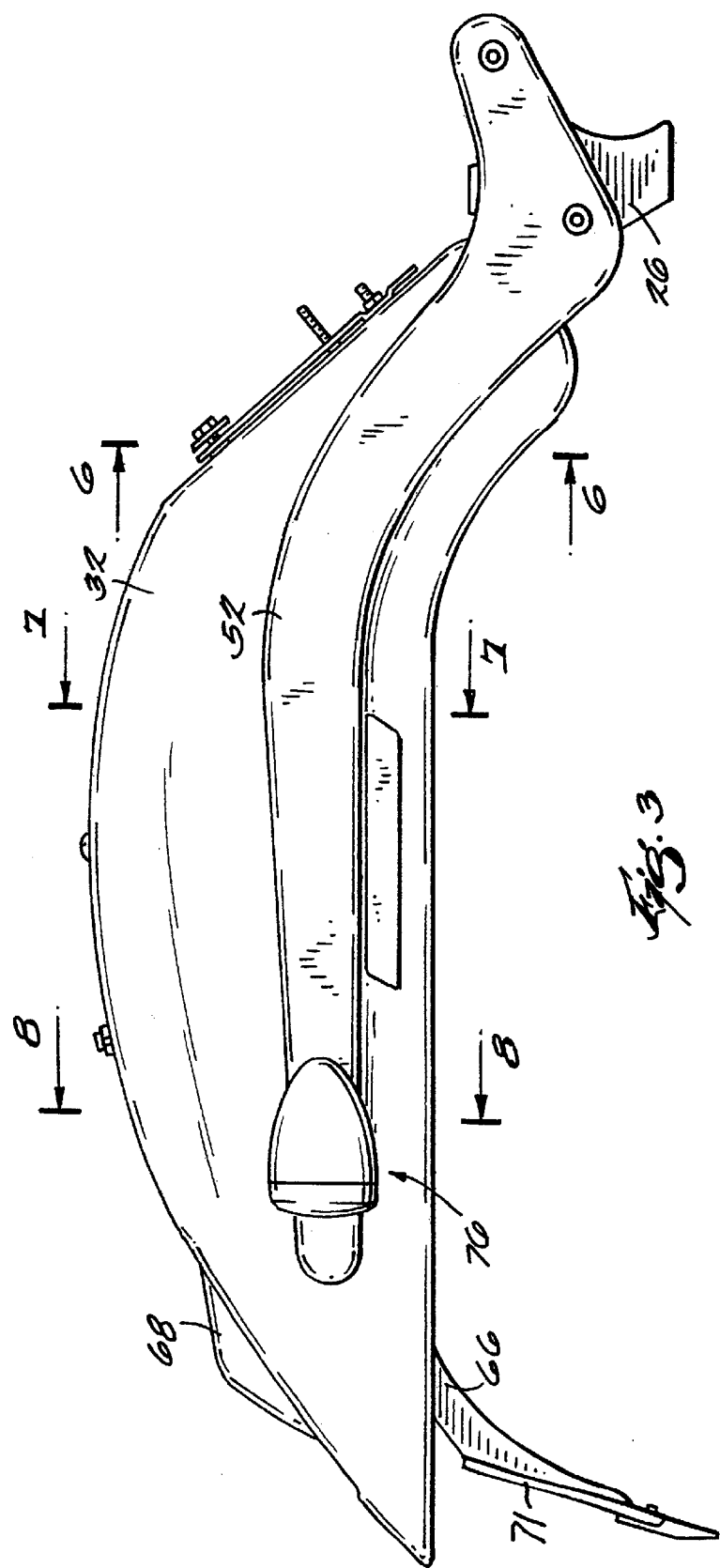
FIG. 3 is an enlarged side view of the tail section of FIG. 1.

Referring to FIGS. 2–8, the tail section 24 includes tail supports 26 coupled to the frame 12. In the illustrated embodiment, the tail supports 26 are formed integrally with the frame 12 in a conventional manner, but could also be bolted to the frame 12. The tail supports 26 include inner surfaces 28 (FIG. 5) facing toward the centerline of the motorcycle 10, and outer surfaces facing away from the centerline of the motorcycle 10. For ease of illustration, only one side of the tail section 24 is illustrated in FIG. 2. In this regard, only one side of the tail section 24 will be described below, unless otherwise noted.

A rear fender 32 is positioned between the tail supports 26, and includes flanges 34 extending downwardly adjacent the inner surfaces 28 of the corresponding tail supports 26. The rear fender 32 is coupled to the tail supports 26 by a fender mounting assembly including a low profile fastener 36 extending through the tail support 26 and through the corresponding flange 34 in the rear fender 32. The illustrated fastener 36 includes a stud plate 38 and two threaded studs 40 secured to the stud plate 38. Preferably, the threaded studs 40 include a low profile head 42. Threaded nuts 44 are threaded onto the threaded studs 40 to hold the assembly together.

In order to provide rigidity to the rear fender 32, the fender mounting assembly includes inner supports 46 mounted along the inner surface of each flange 34. The inner supports 46 are secured to the tail supports 26 by the low profile fasteners 36 and corresponding nuts 44. The inner supports 46 extend rearward further than the tail supports 26 to provide rigidity to the rear portion of the rear fender 32. A support fastener 48 secures the end of the inner support 46 to the rear fender 32. Each inner support 46 includes a groove 50 (FIGS. 6 and 7) that defines a wire path, the importance of which is described below in more detail.

The motorcycle 10 further includes tail covers 52 positioned over the tail supports 26 and a portion of the rear fender 32. Each tail cover 52 is secured to the tail support 26 by fasteners 54, and is designed to cover the low profile fastener 36 to thereby improved the aesthetics of the motorcycle 10. The tail cover 52 is also secured using an inner fastener 56 that extends through the inner support 46 and rear fender 32, and threads into a threaded opening 58 in the tail cover 52. Another inner fastener 60 extends through the rear fender 32, and into another threaded opening 62 in the rear end of the tail cover 52.

A tail light assembly 64 is mounted to the rear end of the rear fender 32. The tail light assembly 64 includes a rear housing 66, a tail light 68 mounted to the rear fender 32, and a rear lighting harness 70 extending from the tail light 68 toward the front of the motorcycle 10. The rear housing 66 provides extra stiffness to the rear section of the rear fender 32, provides a location 71 for mounting a license plate, and provides protection to the rear lighting harness 70.

The rear housing 66 is secured to the rear fender 32 by the support fastener 48 that extends through the rear fender 32, through the rear housing 66, and into the inner support. The rear housing 66 is also secured by the inner fastener 60 that extends from the inside, through the rear housing 66 and rear fender 32, and into the threaded opening 62 in the tail cover 52.

The rear housing 66 includes a recessed portion 72 that facilitates routing the rear lighting harness 70 from the tail light 68 to the groove 50 in the inner support 46. The rear lighting harness 70 travels along the groove 50 and passes through an opening 74 in the front of the rear fender 32 where it can be routed to a main terminal (not shown).

A directional light assembly 76 is mounted to the tail cover 52 by a fastener 78 extending from the inside of the tail cover 52. In this manner, the fastener 78 will be completely hidden from view in the final assembled product. Wires 80 from the directional lights extend through the tail cover 52 and through a fender opening to be routed to a cavity defined between the rear housing 66 and the tail light 68. At this location, the wires 80 are coupled to the rear lighting harness 70.

Figure 9:
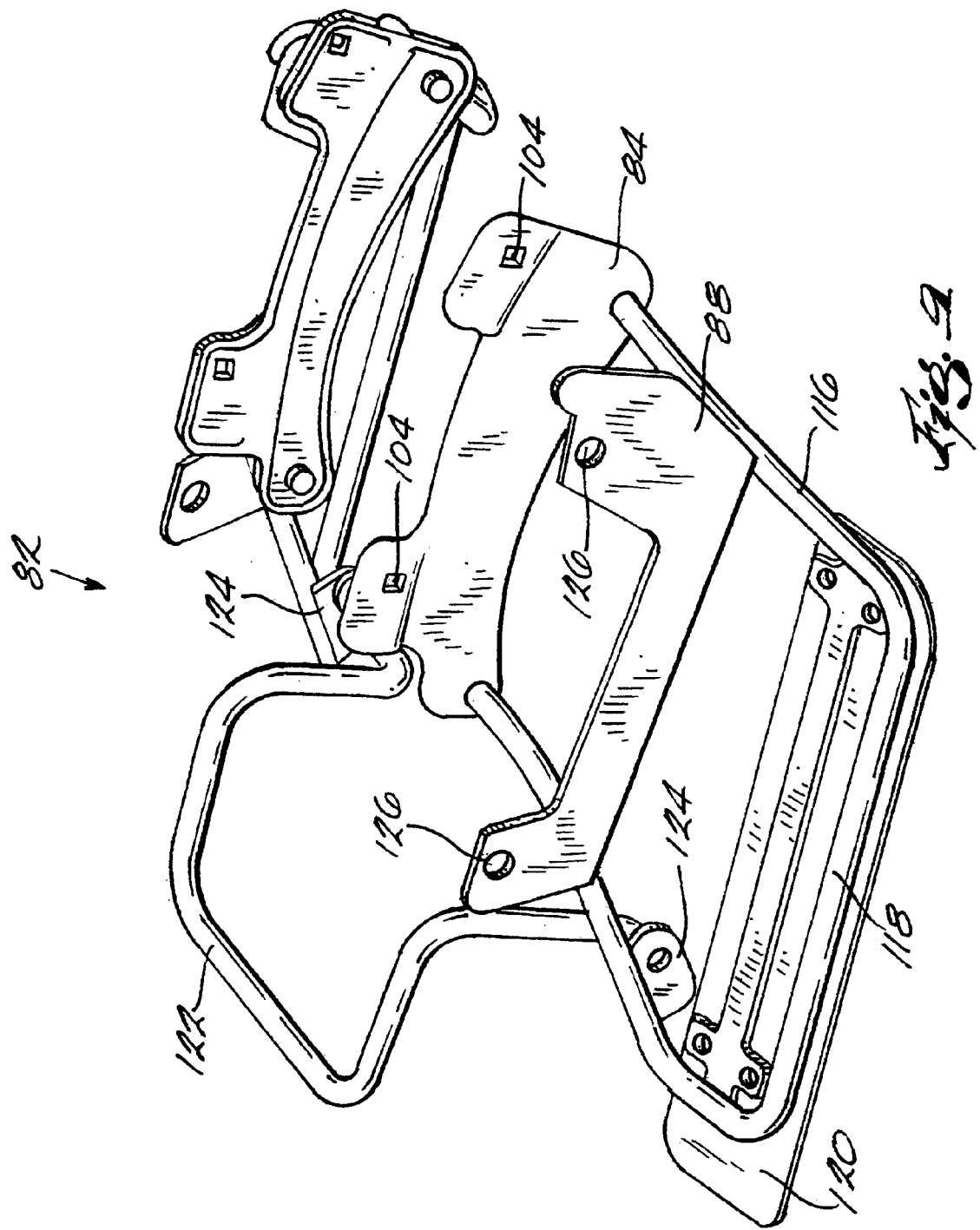
FIG. 9 is a perspective view of a saddlebag mounting system embodying the present invention.

The above-described motorcycle can be provided with a saddlebag mounting system 82, as illustrated in FIGS. 9–11. Mounting saddlebags on the illustrated motorcycle is difficult due to the fact that there are no visible fasteners along the sides of the rear fender 32. Typically, any such visible fasteners could be used to secure a saddlebag mounting bracket to the rear fender.

The illustrated saddlebag mounting system 82 overcomes this problem by mounting, on both sides of the motorcycle, an inner bracket 84 to the inside surface of the rear fender 32, and mounting the saddlebag 86 to an outer bracket 88 that is connected to the inner bracket 84.

Figure 5A:
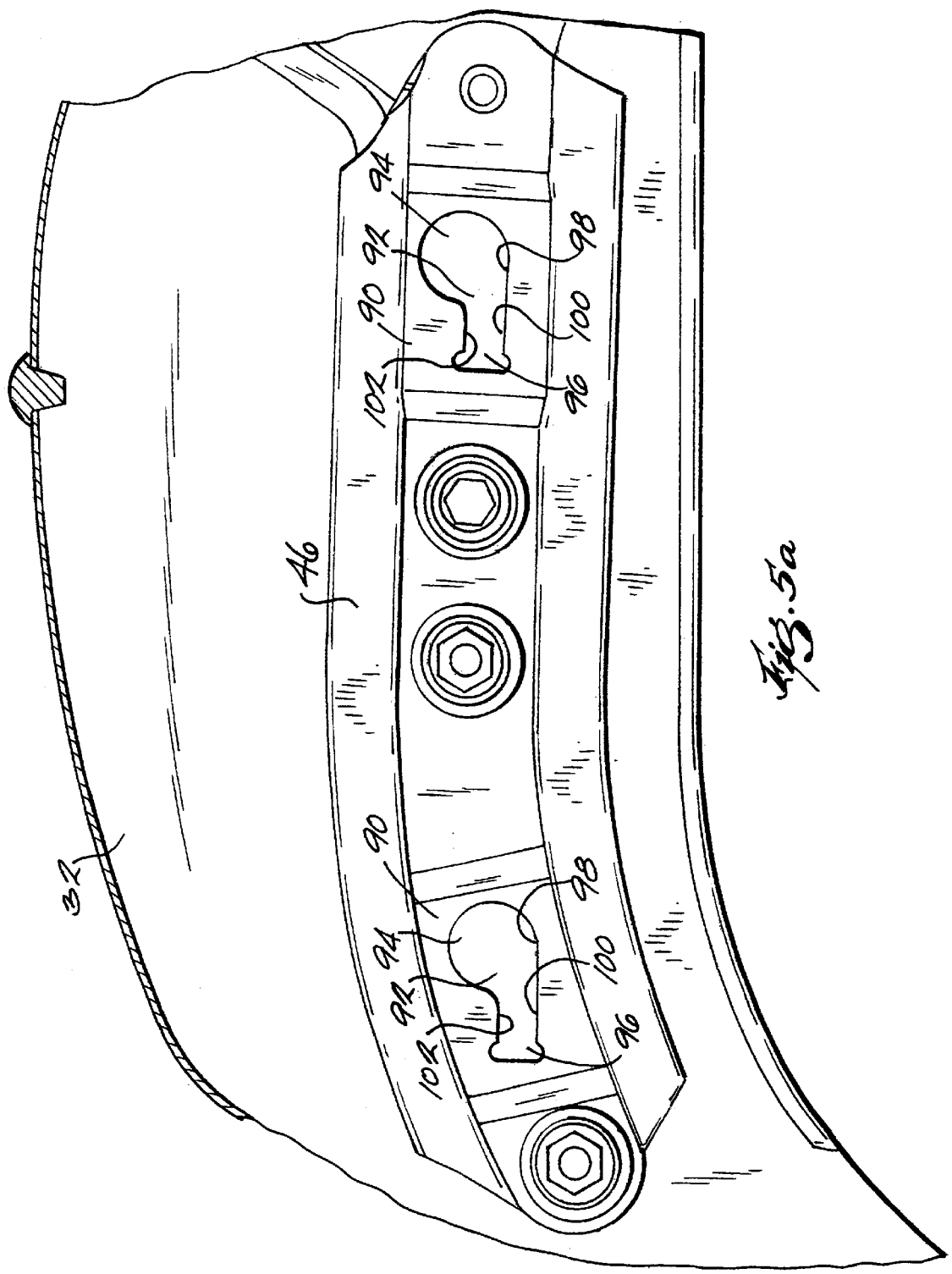
FIG. 5a is an enlarged view of a portion of FIG. 5.
Figure 6:
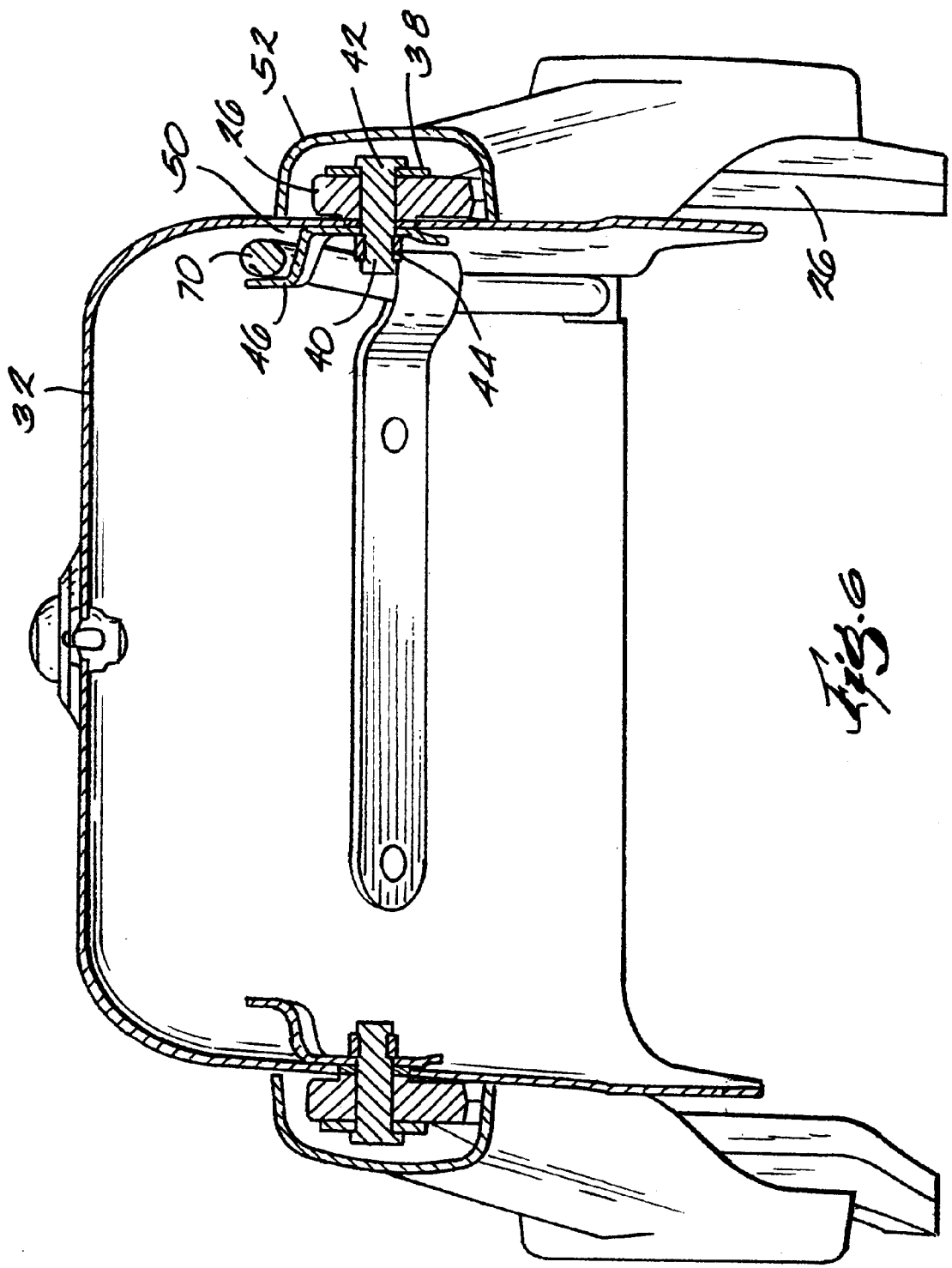
FIG. 6 is a section is a section view taken along line 6—6 in FIG. 3.
Figure 7:
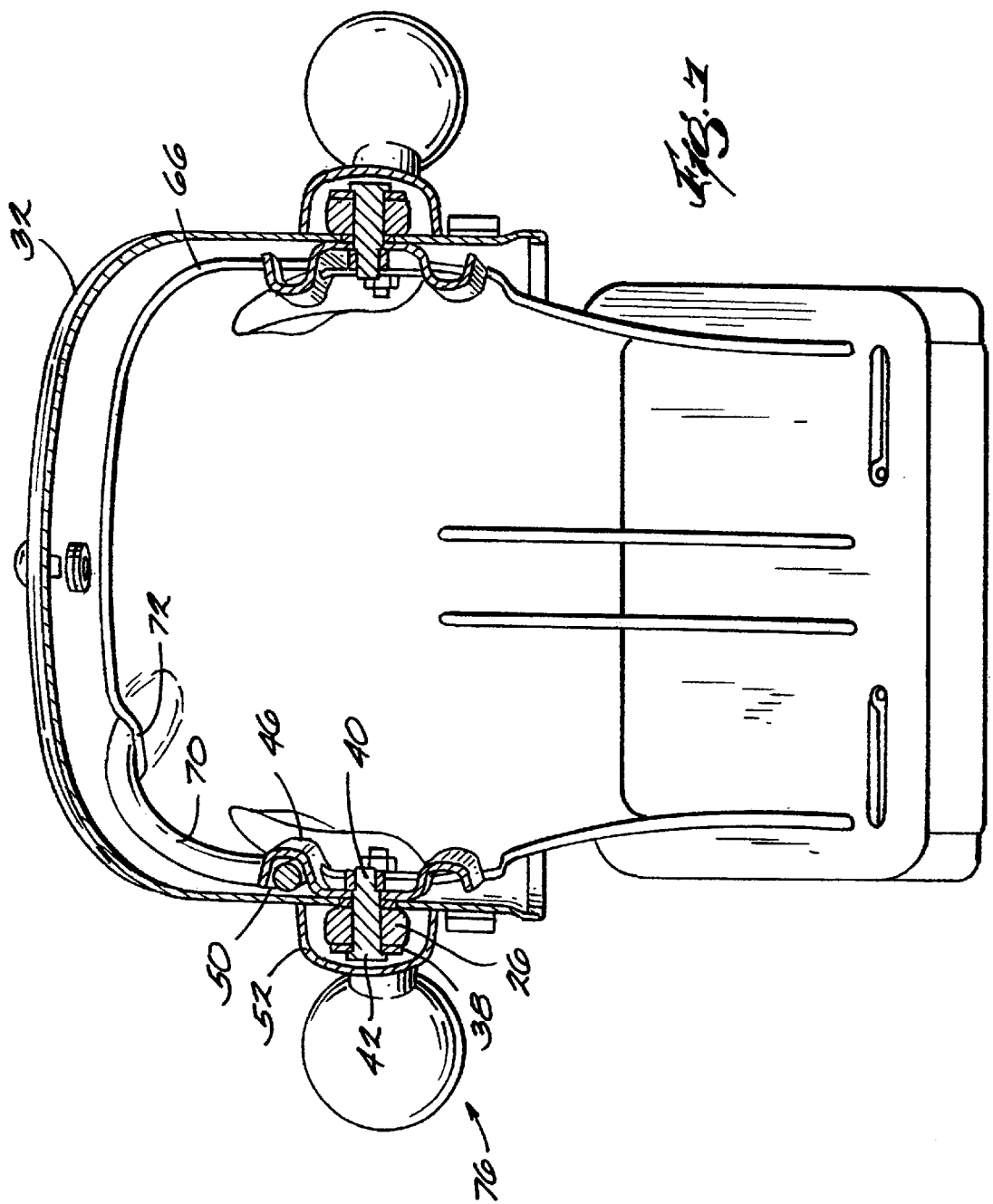
FIG. 7 is a section view taken along line 7—7 in FIG. 3.
Figure 8:
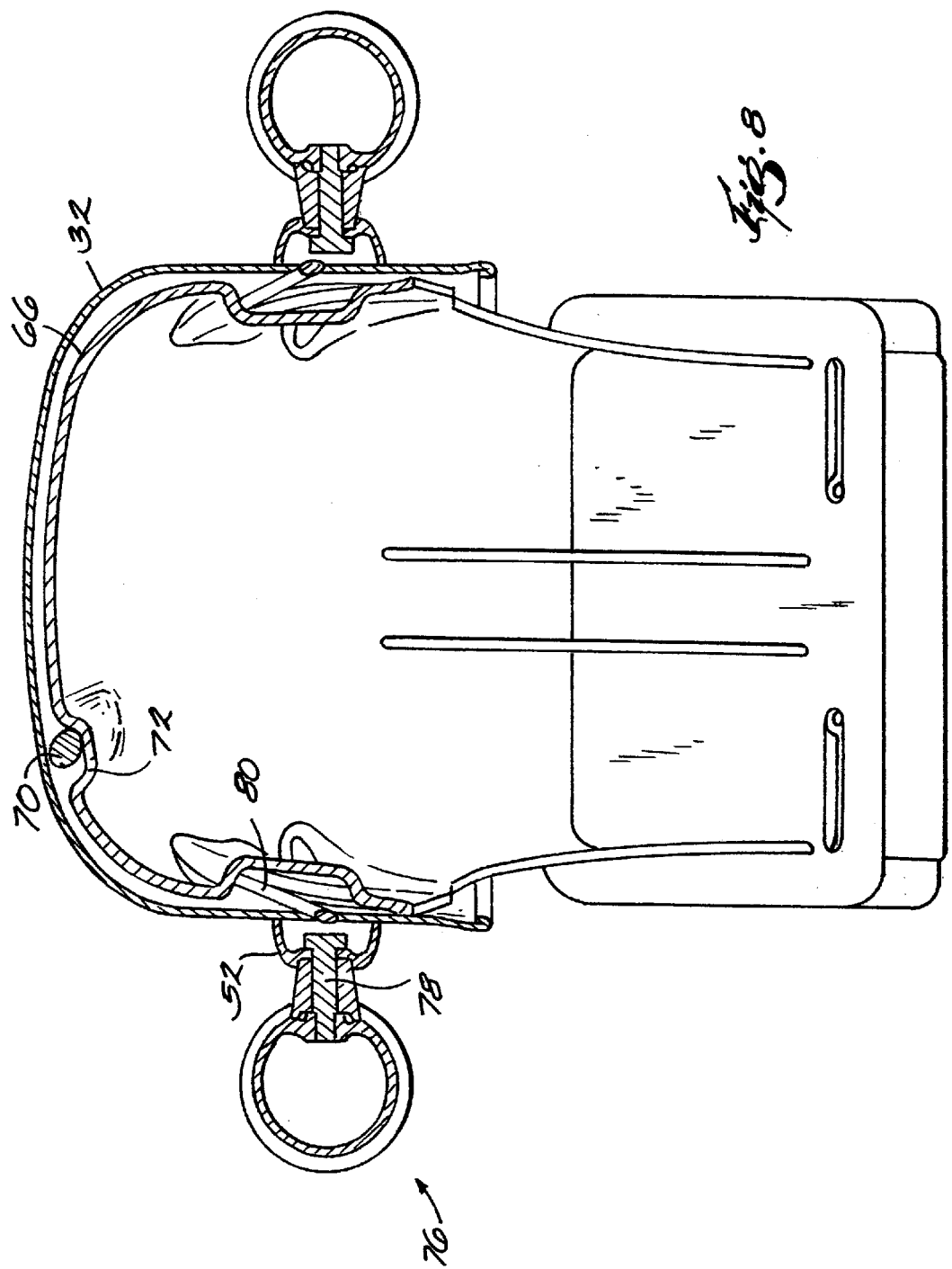
FIG. 8 is a section view taken along line 8—8 in FIG. 3.

More specifically, the inner bracket 84 is fastened to the inner support 46 that is connected to the inside surface of the rear fender 32. Referring to FIGS. 5 and 5a, the inner support 46 includes two raised portions 90 that are spaced from the inner surface of the rear fender 32. Each raised portion 90 includes a slotted opening 92 having a wide portion 94 and a narrow portion 96. The bottom edge 98 of the wide portion 94 is aligned with and tangential to the bottom edge 100 of the narrow portion 96. The narrow portion 96 further includes a top edge 102 that is substantially parallel to the bottom 100 edge of the narrow portion 96.

Referring to FIGS. 9–11, the inner bracket 84 includes two openings 104 that are spaced from each other by substantially the same distance as the spacing between the slotted openings 92 in the inner support 46. In order to secure the inner bracket 84 to the inner support 46, carriage bolts 106 are inserted into each of the openings 104 of the inner bracket 84 from the outside, and corresponding nuts 108 are loosely threaded onto the carriage bolts 106. The heads 110 of the carriage bolts 106 are sized to be smaller than the wide portion 94 of the slotted openings 92 and larger than the narrow portion 96 of the slotted openings 92. In this regard, the heads 110 of the carriage bolts 106 can be inserted into the wide portions 94 of the corresponding slotted openings 92, and then slid forward so that the carriage bolts 106 are positioned in the narrow portion 96 of the slotted openings 92. As is common with standard carriage bolts, the illustrated carriage bolts 106 each include a square shank 112 between the threaded shank 114 and the head 110. The square shank 112 is dimensioned to slide within the narrow portion 96 of the slotted opening 92, and will not rotate once it is in that position, thereby providing an antirotation effect. Once in this position, the nuts 108 can be tightened to secure the inner bracket 84 to the inner support 46.

The inner bracket 84 and outer bracket 88 are interconnected by a support member in the form of a generally U-shaped tube 116. The ends of the U-shaped tube 116 are secured to the inner bracket 84, and the outer bracket 88 is secured to a midportion of the U-shaped tube 116. A lower portion 118 of the U-shaped tube 116 is designed to support the bottom of the saddlebag 86 (FIG. 11), as is known in the art. If desired, the lower portion 118 can also support a heat shield 120 (FIG. 9) to protect the saddlebag 86 from heat dissipated by adjacent exhaust pipes or mufflers (not shown). A connecting member in the form of a connecting tube 122 is mounted between flanges 124 on the U-shaped tubes 116. The connecting tube 122 adds stability to the saddlebag mounting system 82.

Each outer bracket 88 includes two mounting holes 126 that facilitate mounting the saddlebag 86 to the outer bracket 88. In the illustrated embodiment, the saddlebag 86 is mounted to the outer bracket 88 using a quarter-turn fastener 128. Alternatively, screws, bolts, or other appropriate fastener could be used.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle comprising:
   a frame;
   a front wheel coupled to said frame;
   a rear wheel coupled to said frame;
   a rear fender coupled to said frame and positioned over said rear wheel, said rear fender including an inner surface generally facing said rear wheel;
   an inner support directly mounted to and extending longitudinally along said inner surface of said rear fender;
   a saddlebag mounting system directly mounted to said inner support; and
   a saddlebag supported by said saddlebag mounting system.

2. A motorcycle as claimed in claim 1, wherein said mounting system includes:
   an inner bracket extending between said rear wheel and said inner surface and being directly mounted to said inner support; and
   an outer bracket coupled to said inner bracket and extending out from between said rear wheel and said inner surface, said saddlebag being mounted to said outer bracket.

3. A motorcycle as claimed in claim 2, wherein said inner support includes a slotted opening, said motorcycle further comprising a fastener coupling said inner bracket to said inner support, said fastener having a head portion positioned within said slotted opening.

4. A motorcycle as claimed in claim 3, wherein said slotted opening includes:
   a wide portion larger than said head portion; and
   a narrow portion smaller than said head portion.

5. A motorcycle as claimed in claim 4, wherein said wide portion includes a first edge and said narrow portion includes a second edge that is tangential to said first edge.

6. A motorcycle as claimed in claim 5, wherein said first and second edges collectively form a lower edge of said slotted opening.

7. A motorcycle as claimed in claim 2, wherein said outer bracket includes an opening, and wherein said mounting system further includes a fastener positioned through said opening and connecting said saddlebag to said outer bracket.

8. A motorcycle as claimed in claim 2, wherein said inner bracket and said outer bracket are interconnected by a support member.

9. A motorcycle as claimed in claim 8, wherein said saddlebag and said saddlebag mounting system are positioned on one side of the motorcycle and wherein said motorcycle further includes a saddlebag and saddlebag mounting system on an opposing side of the motorcycle, and further comprising a transverse member connecting said support members.

10. A motorcycle as claimed in claim 1, further comprising an exhaust pipe coupled to said motorcycle for expelling exhaust gases, and a heat shield coupled to a lower portion of said saddlebag to shield said saddlebag from heat dissipated by said exhaust pipe.

11. A motorcycle comprising:
    a frame;
    a front wheel coupled to said frame;
    a rear wheel coupled to said frame;
    a rear fender coupled to said frame and positioned over said rear wheel, said rear fender including an inner surface generally facing said rear wheel;
    a saddlebag mounting system having an inner bracket mounted to said inner surface of said rear fender and positioned between said inner surface and said rear wheel, said saddlebag mounting system having a portion extending from said inner bracket to define a saddlebag support surface; and
    a saddlebag mounted to said saddlebag support surface and supported by said saddlebag mounting system.

12. The motorcycle of claim 11, wherein said portion of said saddlebag mounting system extends generally downwardly from said inner bracket, and extends below said fender and outwardly away from said rear wheel.

13. The motorcycle of claim 11, further comprising an inner support mounted directly to said inner surface of said rear fender and positioned between said inner surface and said rear wheel, said inner bracket being mounted directly to said inner support.

14. The motorcycle of claim 13, further comprising a tail support directly mounted to a rear portion of said frame and extending rearwardly therefrom, wherein said rear fender further includes an outer surface facing generally away from said rear wheel, and wherein said rear fender is sandwiched between said inner support and said tail support with said inner support and tail support extending along said inner and outer surfaces, respectively, of said rear fender.

15. A motorcycle comprising:
    a frame;
    a front wheel coupled to said frame;
    a rear wheel coupled to said frame;
    a rear fender coupled to said frame and positioned over said rear wheel, said rear fender including an inner surface generally facing said rear wheel, and a lower edge extending along the bottom of said fender;
    a saddlebag mounting system having a first portion mounted to said inner surface of said rear fender at a mounting point, said first portion extending from said mounting point generally downwardly between said rear wheel and said inner surface below said lower edge, and a second portion extending from said first portion outwardly away from said rear wheel to define a saddlebag support surface; and
    a saddlebag mounted to said saddlebag support surface and supported by said saddlebag mounting system.

16. The motorcycle of claim 15, further comprising an inner bracket mounted to said inner surface of said rear fender at said mounting point and positioned between said inner surface and said rear wheel, wherein said first portion of said saddlebag mounting system is directly mounted to said inner bracket.

17. The motorcycle of claim 16, further comprising an inner support mounted directly to said inner surface of said rear fender and positioned between said inner surface and said rear wheel, said inner bracket being mounted directly to said inner support.

18. The motorcycle of claim 17, further comprising a tail support directly mounted to a rear portion of said frame and extending rearwardly therefrom, wherein said rear fender further includes an outer surface facing generally away from said rear wheel, and wherein said rear fender is sandwiched between said inner support and said tail support with said inner support and tail support extending along said inner and outer surfaces, respectively, of said rear fender.

* * * * *